United States Patent [19]

Taylor et al.

[11] 4,181,921

[45] Jan. 1, 1980

[54] HARMONIC DISTORTION ATTENUATOR

[75] Inventors: Robert E. Taylor, Cadillac; Paul J. Lee, Lake City, both of Mich.

[73] Assignee: W. N. Phillips, Inc., Lake City, Mich.

[21] Appl. No.: 916,051

[22] Filed: Jun. 16, 1978

Related U.S. Application Data

[62] Division of Ser. No. 760,379, Jan. 18, 1977, abandoned.

[51] Int. Cl.² .......................... H02H 7/20; H02H 3/20
[52] U.S. Cl. ........................................ 361/56; 361/91; 361/110; 361/55; 307/252 B
[58] Field of Search ...................... 361/56, 55, 54, 57, 361/91, 110, 111, 104; 323/23, 24, 8, 222; 307/252 B, 200 A, 351, 237, 318

[56] References Cited

U.S. PATENT DOCUMENTS

| 3,573,550 | 4/1971 | Baker, Jr. et al. | 361/56 |
| 3,593,063 | 7/1971 | Cavil | 361/56 |
| 3,878,434 | 4/1975 | Voorhoeve | 361/55 |

*Primary Examiner*—Patrick T. Salce
*Attorney, Agent, or Firm*—John E. McGarry

[57] ABSTRACT

A harmonic distortion attenuator in an AC power supply for reducing electrical energy consumption through the suppression of transient voltages in power supply lines or the like connected to the circuitry wherein a threshold voltage clamp, responsive to a transient, closes an electrical path between the power supply lines. A triac or current responsive device is provided in parallel with the threshold voltage clamp to shunt the current flow from the clamp when the current through the clamp rises above a predetermined limit.

9 Claims, 1 Drawing Figure

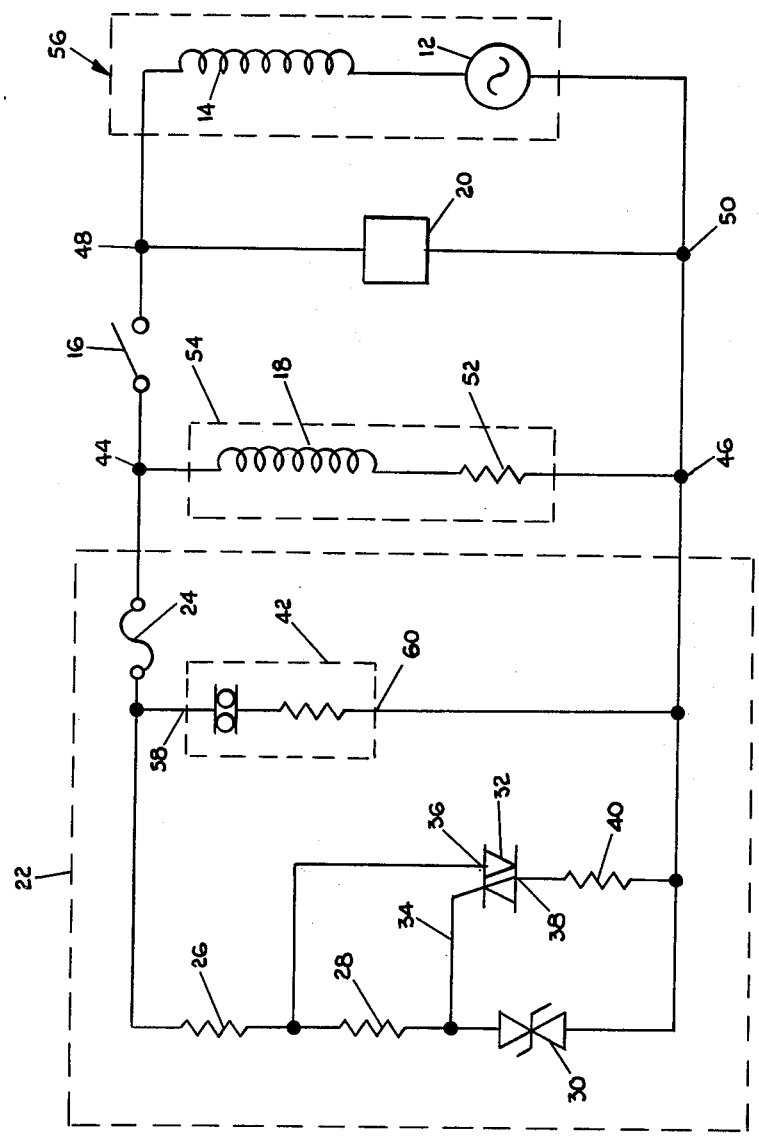

HARMONIC DISTORTION ATTENUATOR

This is a continuation, of application Ser. No. 760,379 filed Jan. 18, 1977; and now abandoned.

BACKGROUND OF THE INVENTION

1. Field of the Invention

This invention relates to electrical energy saving devices and more particularly to a transient voltage suppressor in which a threshold voltage clamp is protected from overloads by a current responsive shunt.

2. State of the Prior Art

In electrical supply lines for example transient voltages occur as a result of lightning strikes, switched loads, clearing of faults and switching of transformer taps. Transients are also generated by inductive loads when power is removed from them unless the load current is zero. The resultant of the presence of the undesirable transients is increased energy consumption, electronic component failure, and increased contact failure to name a few.

Voltage suppressors have been provided in certain electrical equipment to prevent damage to electrical circuits. Further, transient voltage suppressors have been used to suppress voltages in electrical supply lines for the same reason. Components protected by fuses and the like are susceptible to damage by transients due to the relatively long time span necessary for the fuse to clear.

Voltage suppressors used heretofore have included varistors and threshold voltage clamps. These suppressors are connected across AC supply lines to dissipate the transient voltages and are operable only when the voltage rises above a predetermined level near or at the normal peak voltage of the system. When large voltages occur in the line, the components are subject to damage, even with the use of fuses in the line.

The U.S. patent to Vorhoeve, U.S. Pat. No. 3,878,434, issued Apr. 15, 1975, discloses a barrier device for use in a DC power supply between the power input and the power output wherein three triacs are connected between the power supply potential and a common ground. Two of the triacs are triggered by back-to-back zener diode strings and/or responsive to an overcurrent condition in the power supply potential line. The use of the triacs as voltage suppressors undesirably delays the reaction to the transient and thus the Vorhoeve device is not especially suitable for suppressing transients of relatively short duration.

The U.S. patent to Baker, Jr., U.S. Pat. No. 3,573,550, issued Apr. 6, 1971, discloses a transient protection device for an alternating current system wherein a bidirectional breakdown diode is in series with two resistors to trigger the gate electrode of the triac. A bidirectional breakdown diode is in series with the triac to provide a biasing electrical potential for the triac. There is no energy dissipation device in series with the triac and the triac is subject to overloading in the case of high energy transients. Further, since the triac is triggered by the bidirectional diode, the slower reaction time for operation of the triac deleteriously affects the ability of the circuit to respond to high energy, short duration transients.

A reduction of the energy consumption as a result of transient suppression is only presently becoming known to those in this art. Hence, there is a present need in the electrical arts for a fast response transient suppressor which will consume very little power from the power supply lines under normal conditions with no transients present and contain a self-protective means for instance when the suppressor characteristics might be exceeded.

SUMMARY OF THE INVENTION

The present invention provides a means through which electrical energy consumption may be reduced in an AC power supply as a result of transient suppression. The transient suppression device utilizes a bidirectional semiconductor device containing series connected opposing reverse biased P-N junctions hereafter called a threshold voltage clamp. Two resistors are connected in series with the threshold voltage clamp for current limiting and triggering of a birdirectional current shunt parallel to the threshold voltage clamp. Additionally a resistor is connected in series with the shunt so as to limit the current through the shunt. The shunt means desirably includes a triac. The threshold voltage clamp desirably is a zener diode type device in that current can only pass through it when the voltage rises to a predetermined level. In addition a fuse is provided in series with the circuit to disconnect the same when the current exceeds a predetermined limit for a predetermined amount of time.

BRIEF DESCRIPTION OF THE DRAWINGS

The invention will now be described with reference to the accompanying drawing which shows a schematic representation of an AC power supply system utilizing harmonic distortion attenuator according to the invention in a circuit with a typical load.

DESCRIPTION OF THE PREFERRED EMBODIMENT

Referring now to the drawing, a supply 12 and an inductance 14 represent a power source 56 which is connected through terminals 48 and 50 to a switch 16 to terminals 44 and 46. The inductance 14 represents the self inductance of the power supply. An inductance 18 and a resistance 52 represent a typical inductive load 54 commonly found in many household or industrial circuits. The inductive load 54 is connected to terminals 44 and 46 for power from the power source 56 when switch 16 is closed.

A harmonic distortion attenuator 22 is connected between terminals 44 and 46 in parallel with the inductive load 54, but intermediately connected between the load 54 and the switch 16 so as to shunt the undesirable transients produced by the load 54 upon the closing or opening of switch 16, thereby providing transient protection to the inductive load 54 portion of the circuit. A second harmonic distortion attenuator 20 of a construction like attenuator 22 is connected to terminals 48 and 50 in parallel with the power source 56 so as to shunt the undesirable transients produced by the inductance 14 of the power source 56 upon the opening or closing of switch 16 or by the supply 12.

The harmonic distortion attenuator 22 comprises a fuse 24 which is to prevent prolonged excess power dissipation. The fuse 24 is placed in series with the circuit which comprises a power dissipating resistor 26 in series with a current detecting resistor 28 in series with a threshold voltage clamp 30. The clamp 30 is a fast reacting conductor device containing series connected, opposing reverse biased P-N junctions. The clamp is normally open but closes quickly when a predetermined voltage, above normal line voltage, is present across terminals 44 and 46. A triac 32 has gate lead 34 connected between the current detecting resistor 28 and the threshold voltage clamp 30. A first electrode lead 36 of triac 32 is connected between the power dissipating resistor 26 and the current detecting resistor 28. A second lead 38 of triac 32 is connected through a second power dissipating resistor 40 to terminal 46. Lead 58 of an indicator 42 is connected between the fuse 24 and the first power dissipating resistor 26 while lead 60 of indicator 42 is connected to resistor 40, threshold voltage clamp 30, and terminal 46.

Under normal conditions when switch 16 is closed, power is supplied to the inductive load 54 and the harmonic distortion attenuator 22. Normally no current flows through the threshold voltage clamp 30 or the triac 32. Current normally flows through the indicator 42 to show that the fuse is operable.

Frequently when motors or other types of inductive loads such as inductive load 54 are switched out of the circuit, a voltage spike is produced across the inductive load (between terminals 44 and 46). At the same instant another transient will be generated by the inductance 14 of the power source 56 which will then be seen at terminals 48 and 50. Therefore it can be seen that it would be desirable to place a harmonic distortion attenuator at the power source (input to the circuit) as well as at the inductive loads.

With the harmonic distortion attenuator according to the invention, these voltage spikes are greatly suppressed, thus minimizing the effects of the transients. When a voltage spike occurs above the predetermined threshold of the clamp 30 between terminals 44 and 46, current will begin to flow through the resistors 26 and 28 and through the threshold voltage clamp 30. The resistors 26 and 28 function to increase the rate of energy dissipation from the inductive load 54 thereby reducing the power dissipation in the threshold voltage clamp 30. The threshold voltage clamp 30 provides a path for the current generated by the counter EMF of the inductance 18 of the inductive load 54 thereby reducing the voltage developed between the terminals 44 and 46.

Inasmuch as the threshold voltage clamp 30 is a solid state component, it is subject to damage when subjected to relatively prolonged periods of high power dissipation. The threshold voltage clamp 30 is therefore selected to operate above a first predetermined voltage between terminals 44 and 46. The first predetermined voltage can be about 200 peak volts.

In the event that the current flow through resistor 28 rises above the second predetermined limit, current will flow through the gate 34 of the triac 32 thus causing current to flow through the gate 34 of the triac 32 thus causing current to flow between the first terminal 36 and the second terminal 38 of the triac 32 thus providing a current path through resistor 40 in parallel with the threshold voltage clamp 30 and resistor 28. The values of resistors 26 and 40 are chosen such that the voltage across the threshold voltage switch 30 is reduced to the extent that it becomes nonconductive, when the triac 32 is conducting. In this manner, continued power dissipation in the threshold voltage clamp 30 ceases after a predetermined current level is reached in the switch 30. If the transient continues for a prolonged time or if repetitive transients occur, the current will be such as to blow fuse 24.

The harmonic distortion attenuator 20 will react similarly to harmonic distortion attenuator 22 on transients between terminals 48 and 50 produced by the inductance 14 or supply 12 of the power source 56.

Whereas the invention has been described with reference to a particular type of triac protection circuit for the threshold voltage clamp 30, other types of protection circuits can be used. For example, a resistor which is temperature sensitive and has a positive coefficient of temperature can be used in series with the threshold voltage clamp 30 to decrease the current therethrough, thereby decreasing the power dissipated in the threshold voltage clamp 30.

Reasonable variation and modification are possible within the scope of the foregoing disclosure and drawings without departing from the spirit of the invention which is defined in the accompanying claims.

The embodiments of the invention in which an exclusive property or privilege is claimed are defined as follows:

1. In an electrical circuit having a pair of AC power supply lines with AC voltage generally at a first predetermined level therebetween, a harmonic distortion attenuator connected across the power supply lines and having a bidirectional voltage clamping means connected to one of the power supply lines and adapted to close responsive to a voltage above the predetermined level and a first power dissipation means connected in series with the bidirectional clamping means and to the other power supply line to dissipate power only when the voltage applied to the clamping means rises above a first voltage level, the attenuator being adapted to be connected to a voltage source which produces a first voltage level and across a load to suppress and dissipate transient voltage surges above the first voltage level, the improvement which comprises:

bidirectional means connected in parallel with the clamping means and in series with the first power dissipation means for shunting current passing through said first power dissipation means across said clamping means to said one power supply line, said bidirectional means being operative to pass current therethrough only when the current through the clamping means rises above a predetermined level and being open when the current through the clamping means is below the predetermined level;

whereby the clamping means is protected from excess current surges.

2. An electrical circuit according to claim 1 wherein the bidirectional means includes a second power dissipation means for dissipating power only when the bidirectional means is in conducting condition, the first and second power dissipation means being selected so that current through the clamping means tends to zero when the bidirectional means is operative.

3. A circuit according to claim 2 wherein the bidirectional means includes a triac.

4. A circuit according to claim 3 wherein the clamping means is a semiconductor having series connected, opposing reverse biased P-N junctions.

5. A circuit according to claim 4 and further comprising a fuse in series with the clamping means for opening the circuit thereto when the current exceeds a predetermined limit.

6. A circuit according to claim 4 and further comprising a current detecting means connected in series between the first power dissipation means and the clamping means, the triac has a gate which is connected to a lead between the current detecting resistor and the clamping means, and the triac has a first electrode which is connected to a second lead between the power dissipation means and the current detecting means.

7. A circuit according to claim 1 wherein the bidirectional means includes a triac.

8. A circuit according to claim 1 wherein the clamping means is a semiconductor having series connected, opposing reversed biased P-N junctions.

9. A circuit according to claim 1 and further comprising a fuse connected in series with the clamping means to stop the current flow thereto in the event that the current exceeds a predetermined limit.

* * * * *